(12) United States Patent
Combs

(10) Patent No.: US 7,577,870 B2
(45) Date of Patent: Aug. 18, 2009

(54) METHOD AND SYSTEM FOR CONTROLLING COMMAND EXECUTION

(75) Inventor: William E. Combs, Seattle, WA (US)

(73) Assignee: The Boeing Company, Chicago, IL (US)

( * ) Notice: Subject to any disclaimer, the term of this patent is extended or adjusted under 35 U.S.C. 154(b) by 519 days.

(21) Appl. No.: 11/313,453

(22) Filed: Dec. 21, 2005

(65) Prior Publication Data

US 2008/0155306 A1    Jun. 26, 2008

(51) Int. Cl.
G06F 11/00  (2006.01)

(52) U.S. Cl. ............................... 714/13; 714/3; 714/11; 714/47

(58) Field of Classification Search ............ 714/3, 714/11, 13; 718/104
See application file for complete search history.

(56) References Cited

U.S. PATENT DOCUMENTS

| | | | | |
|---|---|---|---|---|
| 5,687,310 A | * | 11/1997 | Rotker et al. | 714/11 |
| 5,978,933 A | * | 11/1999 | Wyld et al. | 714/13 |
| 6,035,415 A | * | 3/2000 | Fleming | 714/11 |
| 6,161,196 A | * | 12/2000 | Tsai | 714/10 |
| 6,202,170 B1 | * | 3/2001 | Busschbach et al. | 714/11 |
| 6,240,526 B1 | * | 5/2001 | Petivan et al. | 714/11 |
| 6,275,752 B1 | * | 8/2001 | Giers | 701/29 |
| 6,314,532 B1 | * | 11/2001 | Daudelin et al. | 714/38 |
| 6,449,733 B1 | * | 9/2002 | Bartlett et al. | 714/13 |
| 6,477,663 B1 | * | 11/2002 | Laranjeira et al. | 714/11 |
| 6,622,261 B1 | * | 9/2003 | Laranjeira et al. | 714/11 |
| 6,625,751 B1 | * | 9/2003 | Starovic et al. | 714/11 |
| 6,629,260 B1 | * | 9/2003 | Dancer et al. | 714/3 |
| 6,684,396 B1 | * | 1/2004 | Brittain et al. | 717/168 |
| 6,687,849 B1 | * | 2/2004 | Cherf | 714/5 |
| 6,748,554 B2 | * | 6/2004 | Jin et al. | 714/15 |
| 6,757,811 B1 | * | 6/2004 | Mukherjee | 712/220 |
| 6,766,421 B2 | * | 7/2004 | Lasserre et al. | 711/135 |
| 6,823,473 B2 | * | 11/2004 | Mukherjee | 714/10 |
| 6,868,067 B2 | * | 3/2005 | Rostron | 370/241 |
| 6,928,583 B2 | * | 8/2005 | Griffin et al. | 714/11 |

(Continued)

OTHER PUBLICATIONS

Combs et al.; "Combinatorial Rule Explosion Eliminated by a Fuzzy Rule Configuration"; IEEE Trans. Fuzzy Systems, vol. 6, No. 1, pp. 1-11, Feb. 1998.

(Continued)

Primary Examiner—Christopher S McCarthy
Assistant Examiner—Joshua P Lottich
(74) Attorney, Agent, or Firm—Klein, O'Neill & Singh, LLP

(57) ABSTRACT

Method and system for performing a task in a control system is provided. The method includes, transmitting a command to a governing agent; re-transmitting the command from the governing agent to a primary, a secondary and an observer agent; validating the task information; and performing the task wherein, the task is executed by the primary agent while the secondary agent monitors task execution and if the primary agent fails to execute the task and/or a threshold value is exceeded, the secondary agent performs the task to the extent the secondary agent perceives that the task is not being performed and to the extent that it has sufficient capacity. The system includes an input module that transmits commands for executing a task to the governing agent that is operationally coupled to a processing unit.

20 Claims, 4 Drawing Sheets

U.S. PATENT DOCUMENTS

| | | | | |
|---|---|---|---|---|
| 6,971,043 | B2* | 11/2005 | McLoughlin et al. | 714/11 |
| 7,020,800 | B2* | 3/2006 | Fu et al. | 714/38 |
| 7,093,160 | B2* | 8/2006 | Lau et al. | 714/11 |
| 7,178,056 | B2* | 2/2007 | Shanbhogue | 714/7 |
| 7,178,058 | B2* | 2/2007 | Tsukahara | 714/12 |
| 7,197,664 | B2* | 3/2007 | Khosravi | 714/12 |
| 7,225,356 | B2* | 5/2007 | Monitzer | 714/12 |
| 7,228,432 | B2* | 6/2007 | Angelo et al. | 713/182 |
| 7,251,746 | B2* | 7/2007 | Fox et al. | 714/13 |
| 7,296,181 | B2* | 11/2007 | Safford et al. | 714/11 |
| 2002/0010753 | A1 | 1/2002 | Matsuoka et al. | 709/217 |
| 2002/0152418 | A1* | 10/2002 | Griffin et al. | 714/11 |
| 2002/0152419 | A1* | 10/2002 | McLoughlin et al. | 714/11 |
| 2003/0065762 | A1* | 4/2003 | Stolorz et al. | 709/223 |
| 2004/0001431 | A1* | 1/2004 | Rostron | 370/216 |
| 2004/0001449 | A1* | 1/2004 | Rostron et al. | 370/282 |
| 2005/0081110 | A1* | 4/2005 | Rostron | 714/38 |
| 2005/0172164 | A1* | 8/2005 | Fox et al. | 714/13 |
| 2005/0240811 | A1* | 10/2005 | Safford et al. | 714/11 |
| 2005/0278567 | A1* | 12/2005 | Wolfe et al. | 714/11 |
| 2006/0056285 | A1* | 3/2006 | Krajewski et al. | 370/216 |
| 2006/0059478 | A1* | 3/2006 | Krajewski et al. | 717/168 |
| 2006/0085669 | A1* | 4/2006 | Rostron et al. | 714/4 |
| 2006/0101307 | A1* | 5/2006 | Rapp et al. | 714/13 |
| 2006/0107107 | A1* | 5/2006 | Michaelis et al. | 714/11 |
| 2007/0018052 | A1* | 1/2007 | Eriksson | 244/190 |

OTHER PUBLICATIONS

Combs; "Appendix A. The Combs Method for Rapid Inference"; The Fuzzy Systems Handbook, $2^{nd}$ edition, Cox, E. Academic Press, 1998.

Combs; "Author's Reply"; IEEE Transactions on Fuzzy Systems, vol. 7, No. 4, Aug. 1999.

Combs; "Using Fuzzy Logic in Large, Complex Data Mining Applications"; IEEE World Conference on Computational Intelligence, May 2002.

Weinschenk et al.; "Avoidance of Rule Explosion by Mapping Fuzzy Systems to a Union Rule Configuration"; IEEE International Conference on Fuzzy Systems, St. Louis, MO, 2003, pp. 43-48.

Weinschenk et al.; "Layered URC Fuzzy Systems: A Novel Link Between Fuzzy Systems and Neural Networks"; Proc. IEEE International Joint Conference on Neural Networks, Portland, OR, 2003, pp. 2995-3000.

Weinschenk et al.; "On the Use of Fourier Methods in URC Fuzzy System Design"; Proc. IEEE International Conference on Fuzzy Systems, Budapest, Hungary, 2004, pp. 911-916.

Combs et al.; "Genomic Systems Design: A Novel, Biologically-Based Framework for Enhancing the Adaptive, Autonomous Capabilities of Computer Systems"; Proc. IEEE International Conference on Fuzzy Systems, Budapest, Hungary, 2004, pp. 1491-1496.

* cited by examiner

METHOD AND SYSTEM FOR CONTROLLING COMMAND EXECUTION

BACKGROUND

1. Field of the Invention

The present invention relates in general to the control system architecture, and more specifically, to fault tolerant systems.

2. Background of the Invention

Fault-tolerance is a property of a system that allows the system to continue operation in the event of a failure of some of its parts/components. Fault-tolerance is particularly sought-after in high-availability or life/mission-critical systems. Examples of such systems include the space shuttle, aircrafts, missiles, and others.

Fault tolerance is important for mission-critical systems because it diminishes the impact of adverse circumstances that might otherwise impair a system's functionality. It is especially helpful in those situations where an unexpected fault could jeopardize or severely impair the success of a mission. While defect reduction and the ability of a controller to respond to adverse situations are necessary components of reliability, these beneficial characteristics may not be sufficient to guard against in-service malfunctions, accidents, environmental anomalies or hostile action.

Conventional design techniques have tried to achieve fault tolerance in different ways:

Replication: This approach provides multiple identical instances of the same system, directing tasks or requests to all of them in parallel, and choosing the correct result on the basis of a quorum; and Redundancy: This approach provides multiple identical instances of the same system and switches to one of the remaining instances in case of a failure (fall-back or backup).

Component redundancy when employed to achieve fault tolerance has shortcomings. For example, redundancy usually adds weight, space and complexity to a system and may not be a suitable alternative for missions where weight is important.

Often failure in mission critical systems occurs suddenly with very little time to react. The fault tolerance system needs to be agile to accommodate such situations.

Therefore, there is a need for a fault tolerant methodology that can be used to specifically target those situations in which component redundancy might not be a suitable alternative.

SUMMARY OF THE INVENTION

In one aspect of the present invention, a method for performing a task in a control system is provided. The method includes, transmitting a command to a governing agent; re-transmitting the command from the governing agent to a primary agent, a secondary agent and an observer agent; validating the task information; and performing the task wherein the task is executed by the primary agent while the secondary agent monitors task execution and if the primary agent fails to execute the task and/or a threshold value is exceeded, the secondary agent performs the task.

In another aspect of the present invention, a system for controlling and performing a task is provided. The system includes, an input module that transmits commands for executing a task to a governing agent that is operationally coupled to a processing unit, wherein the governing agent transmits the command to a primary agent, a secondary agent and an observer agent; and the task is validated and executed by the primary agent while the secondary agent monitors task execution and if the primary agent fails to execute the task and/or if a threshold value is exceeded, the secondary agent performs the task.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, a generic control system according to one aspect of the present invention is described. The specific architecture and operation of the preferred embodiment will then be described with reference to the general description.

Figure 1:
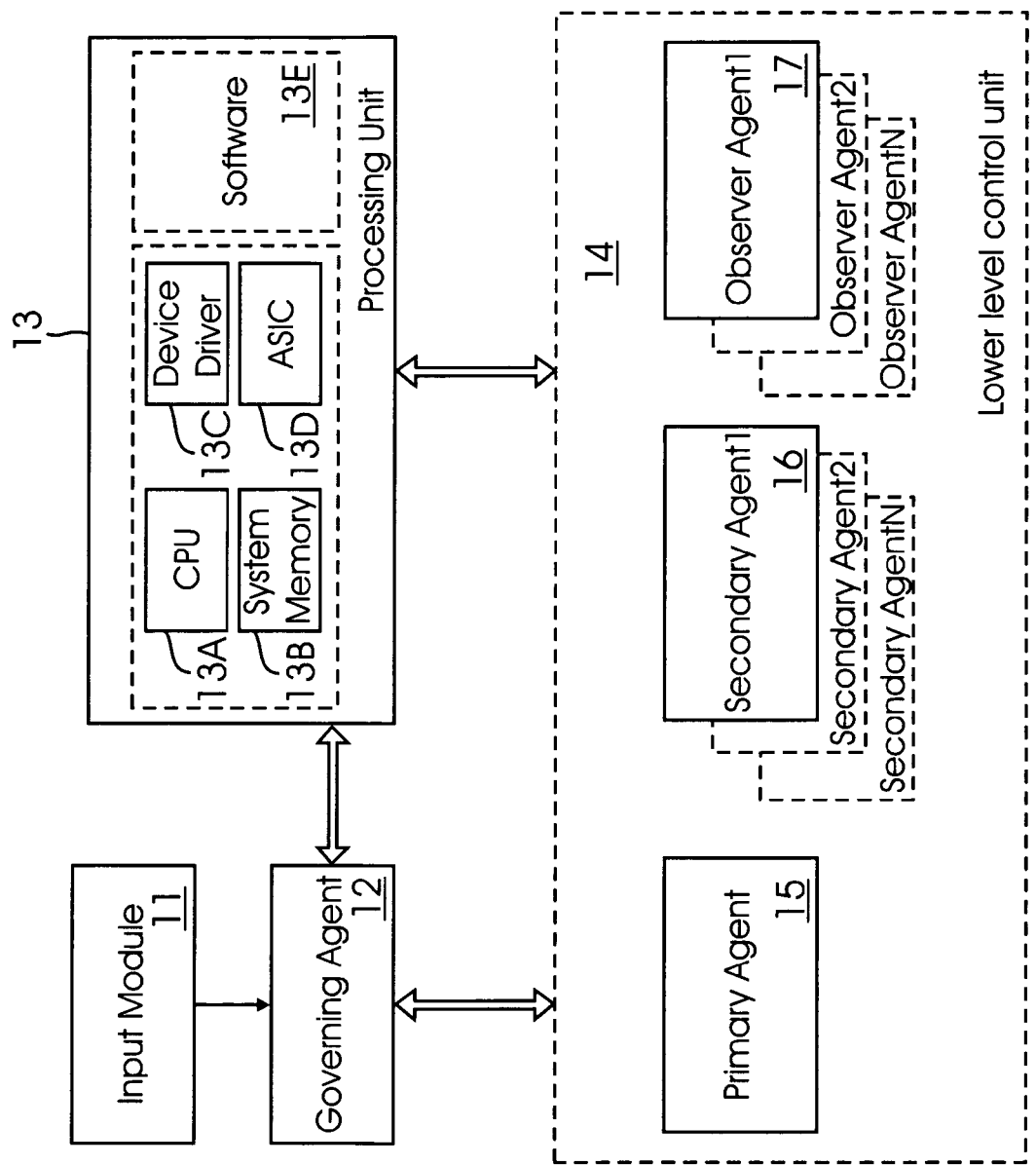
FIG. 1 shows a top-level system diagram of a control system, according to one aspect of the invention.

FIG. 1 shows a top-level system diagram of a control system, according to one aspect of the present invention. The control system includes an input module 11, coupled to a higher level-governing agent 12.

Figure 3:
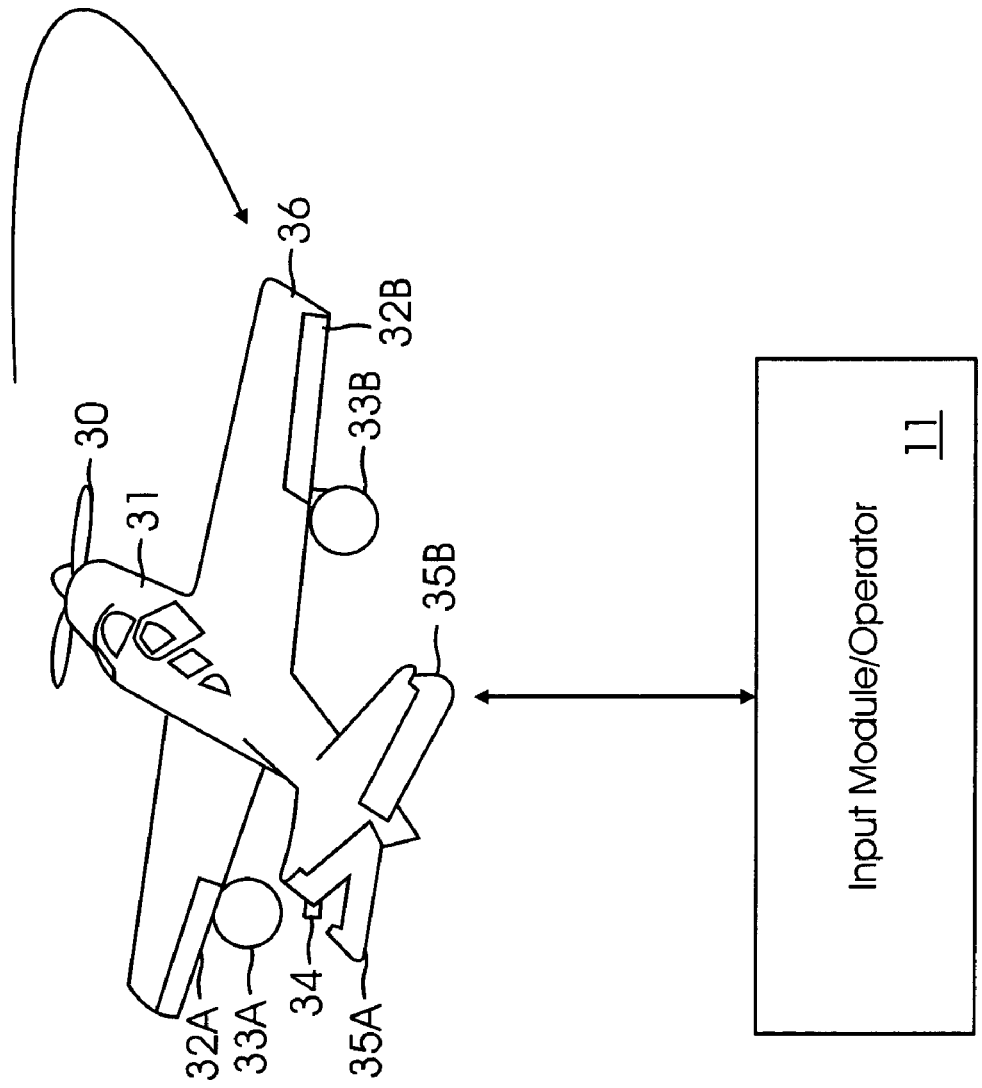
FIG. 3 shows an example of an airplane performing a task and controlled by an input module according to one aspect of the present invention.

The input module is a unit that issues commands to perform a task. For example, an input module can be a technician at a ground station remotely guiding an unmanned aerial vehicle (UAV) as illustrated in FIG. 3.

The governing agent 12 is coupled to a processing unit 13 that processes information received from the governing agent 12 and the lower level control unit (or module, used interchangeably) (s) 14.

The processing unit 13 typically includes several components including a CPU 13A, system (or main) memory 13B, device driver 13C, a software module 13E and an ASIC 13D. The system memory is coupled to the CPU 13A via a system bus (not shown) or a local memory bus.

The main memory 13B provides CPU 13A access to data and/or program information (or to software module 13E) stored in main memory 13B at execution time. Typically, the main memory is composed of random access memory (RAM) circuits.

ASIC 13D performs certain hardware functions specific to the control system. It contains logic to route/process data/commands to/from the governing agent and the lower level control units.

One skilled in the art would appreciate that a device driver is typically present to interface between the hardware components and software 13E.

Software module 13E is loaded during initialization of the control system and keeps track of the overall state of the system. The software module 13E can also be used to control database systems (not shown) that store information like system logs and data related to individual agents of the system. Furthermore, the software module 13E maintains a list of all the agents and the associated tasks that the agents can perform.

The governing agent 12 is coupled to a lower level control unit 14, which includes plural primary agents 15, plural secondary agents 16 and plural observer agents 17.

The term agent as used herein for governing agent, primary, secondary or observer agents refers to an independent software component that is designed to perform a certain task. For example, a governing agent is an upper level software component that controls lower level agents like primary agent 15, secondary agent 16 and observer agent 17. Primary agent 15, secondary agent 16 and observer agent 17 are also software components that are responsible for controlling/monitoring the execution of certain tasks.

It is noteworthy that although FIG. 1 shows governing agent 12 as a separate component, it can simply be a part of software module 13E and perform various functions described herein. Governing agent 12 can also be a part of the firmware for ASIC 13D and perform the functions described herein. The adaptive aspects of the present invention are not limited to any particular structure of governing agent 12.

Figure 4A:
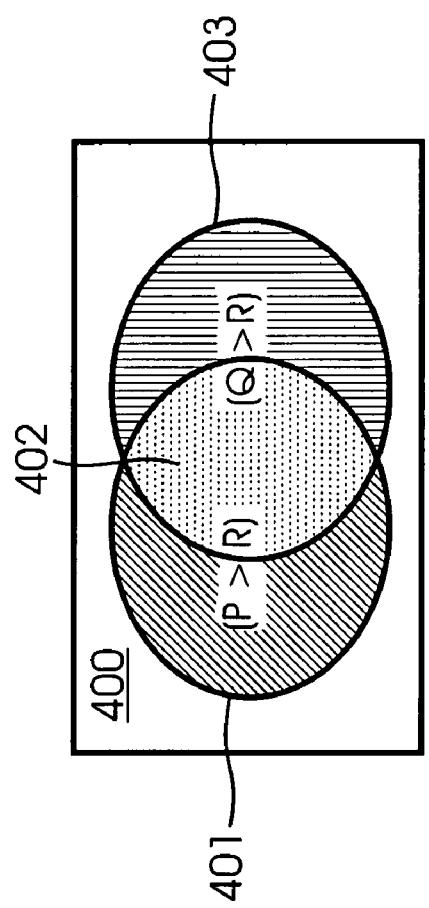
FIG. 4A is a Venn diagram representation of a overlapping Union implication relations.
Figure 4B:
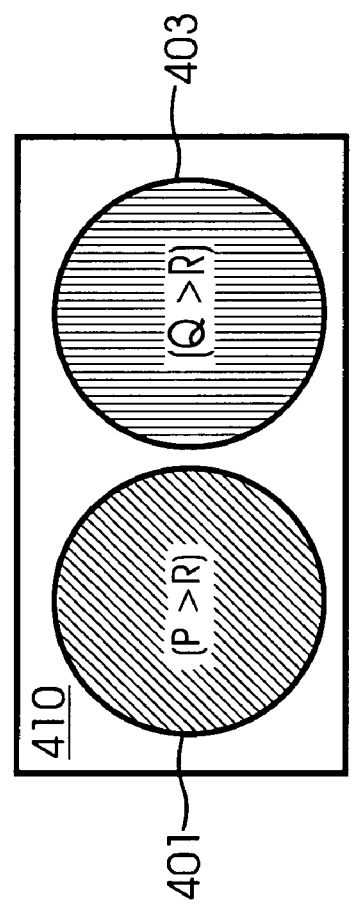
FIG. 4B is a Venn diagram representation of a non-overlapping Union implication relations.

Both the primary agent 15 and secondary agent 16 operate as if they are responsible to control/execute a task. The difference between the two agents is that the primary agent 15 performs a task without any consideration to any threshold values (described below) while the secondary agent 16 performs a task to the extent the secondary agent perceives that the task is not being performed because a threshold value has been exceeded and to the extent that it has sufficient capacity. The primary agent 15 and secondary agent 16 can operate in relative isolation, i.e. both these agents are not aware of each other's operation. The relationship between the primary and secondary agents is shown in FIGS. 4A and 4B and described below in detail.

Primary agent(s) 15 take command information from the governing agent 12, validate the command and send a signal to a controller (not shown) to perform the task while the secondary agents 16 and observer agents 17 monitor task execution. If the primary agent 15 fails to perform the task, the secondary agent 16 then executes the task to the extent the secondary agent perceives that the task is not being performed and to the extent that it has sufficient capacity over and above its own primary tasks.

It is noteworthy that the present invention is not limited to the foregoing system layout of FIG. 1. Various modifications may be made, for example, an ASIC can be used to operate as a processing unit (13) by itself; or one or more state machines may be used to perform the processing unit (13) functionality.

Figure 2:
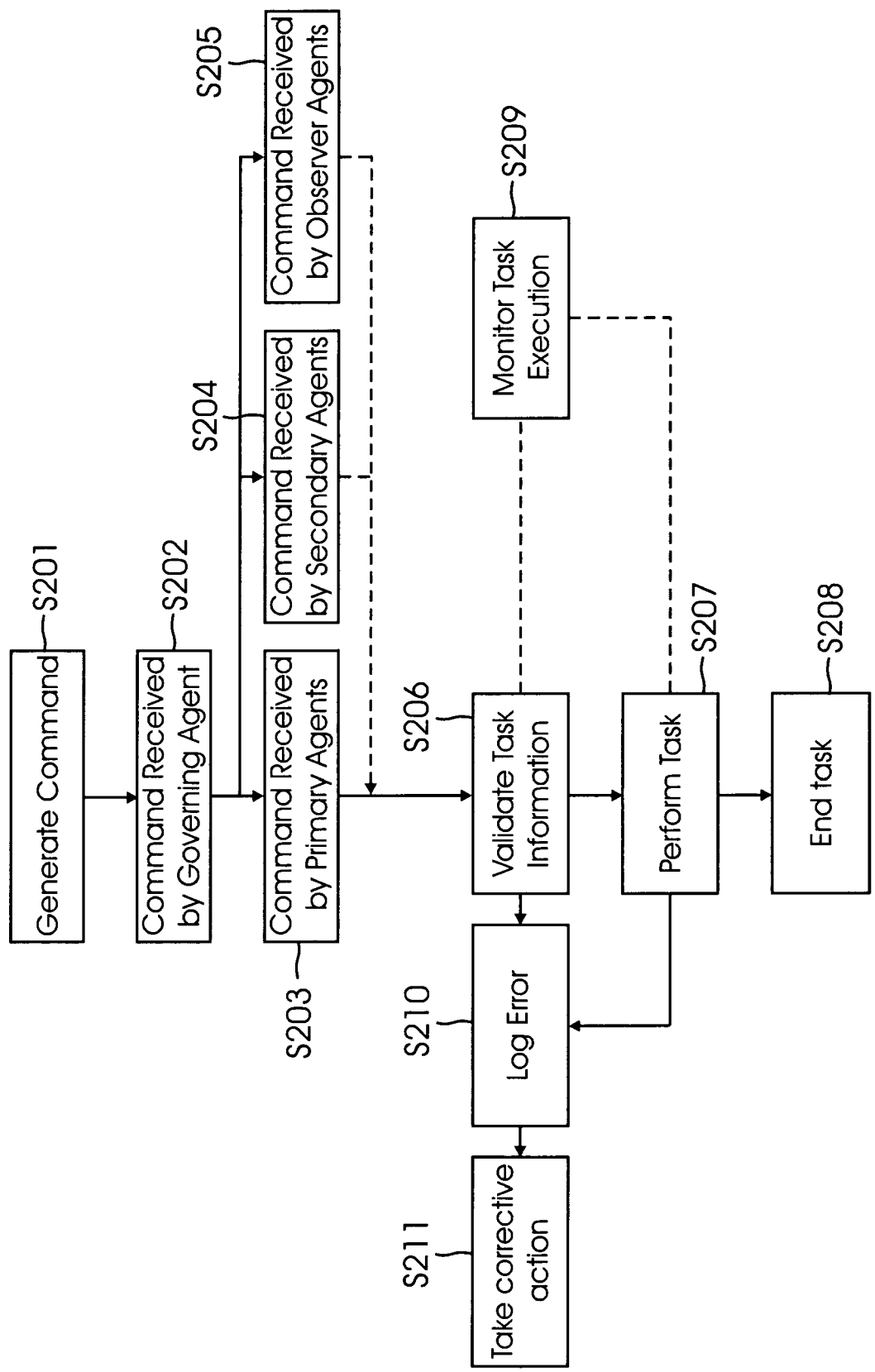
FIG. 2 shows a top-level flow diagram for performing a task in a control system.

FIG. 2 shows a top-level flow diagram for performing a task using the control system, according to one aspect of the present invention. Turning in detail to FIG. 2, in step S201, input module 11 generates a command, which contains information for performing the task and sends the command to a governing agent 12. In step S202, the command is received by governing agent 12.

The processing unit 13 processes the command and retransmits it to the lower level control unit 14. Primary agent 15 in step S203, secondary agent 16 in step S204 and observer agent 17 in step S205 receive the command simultaneously.

To ensure integrity of the command data information, in step S206, the primary agent 15 validates the command information. In one aspect, the primary agent 15 checks command equivalence with the secondary agents 16 and observer agents 17. In the same step secondary agent 16 also validates the command by verifying command equivalence with the primary agent 15 and observer agent 17. The observer agents 17 validate command information by checking the equivalence with the primary agent(s) 15 and the secondary agents 16.

If the command information is invalid in step S206, then an error is logged in step S210. In one aspect, the governing agent 16 monitors the log and takes corrective action based on the nature of the error in step S211.

If the command information is valid (step S206), then in step S207, the task is performed by the primary agent 15. To ensure the functioning of the primary agent 15, a controller (not shown) sends a feedback signal to the primary agent 15. If the feedback signal does not match the expected signal or if no signal is received, then an error is logged in step S210. Again, in this case, the governing agent 17 can take corrective action in step S211 by disabling the malfunctioning control agent.

According to one aspect of the invention, while primary agent 15 performs the task, secondary agents 16 and observer agents 17 monitor the task execution in step S209. During this monitoring, if the primary agent 15 fails to perform the task, the actual task execution is more or less than a threshold value set for the task; or if an error condition occurs, then one of the secondary agents 16 takes over the responsibility of carrying out the task in step S207 as if it were performing the task from the beginning to the extent the secondary agent perceives that the task is not being performed and to the extent that it has sufficient capacity.

When the task is performed without errors, the process flow ends in step S208 and vital statistics can be recorded, analyzed and reported to the governing agent 12.

FIG. 3 shows an example of an airplane or an unmanned aerial vehicle (UAV) performing a task and controlled by an input module (11), according to one aspect of the present invention.

UAV 36, is guided remotely by a technician at a ground station (input module 11). A designer has the responsibility of assigning the primary, secondary and observer agents to perform a task. This information regarding the tasks and the control agents is maintained by the software module 13E in FIG. 1.

When the UAV is required to make a right turn, the technician transmits the information to a governing agent 31. The governing agent 31 retransmits the command to the primary, secondary and observer agents, which obtain the actual position of the UAV. The primary agent 15 checks with the secondary agent to validate the position of the UAV. If the check fails, it will validate the position with the observer agent and the information is logged in an error log maintained by the software module 13E. Similarly, the secondary and observer agents validate the position of the UAV with the primary agents.

Turning right can be accomplished by the rudder 34, and/or the combination of the ailerons 32A, 32B and elevators 35A, 35B working in tandem and/or changing the relative speeds of the engines 33A, 33B. For purposes of illustration in this example, the primary agent 15 controls the rudder 34, the secondary agents 16 control a combination of elevators (35A/35B), the ailerons (32A/32B) and the engines (33A/33B).

When the rudder 34 performs the task by turning the UAV to the right, the secondary agents 16 monitor the position of the UAV and calculate the delta with respect to the initial position of the UAV. According to one aspect of the invention, to the extent that the delta exceeds a certain tolerance, one of the secondary agents 16 takes control and turns the UAV right by the combination of the ailerons 32A, 32B and elevators 35A, 35B working in tandem to the extent the secondary agent perceives that the task is not being performed and to the extent that it has sufficient capacity.

If the other secondary agent 16 determines that the delta of the position exceeds the tolerance, it can also turn the UAV right by changing the relative speeds of the left and right engines 33A and 33B to the extent the other secondary agent perceives that the task is not being performed and to the extent that it has sufficient capacity over and above the primary task(s) that it has been assigned to perform.

FIGS. 4A and 4B show Venn diagrams with primary agent (15) and secondary agent (16) interaction. The logic construct shown in FIGS. 4A and 4B establishes the fault-tolerance architecture described above with respect to FIG. 1. FIG. 4A shows overlapping interaction between the primary agent (15) and the secondary agent (16), while FIG. 4B shows a non-overlapping interaction.

Turning in detail to FIG. 4A, the circle 401 encompassing (P>R) represents the primary objective of a task performed by a primary agent 15. Portion 402 (i.e. intersection of circle 401 and 403) represents overlapping functionality of a primary agent 15 and a secondary agent 16. Circle 403 (Q>R) represents a function of a secondary agent 16 (or observer agent 17) that monitors the system and if the difference (delta) between the request to perform the task and the actual position/function of the aircraft extends beyond a certain threshold, then the secondary agent 16 takes over the functionality to the extent the secondary agent 16 perceives that the task is not being performed. The secondary agent does not know what the primary agent is doing.

If (P>R) (primary agent 15) is performing its primary task, then (Q>R)(secondary agent 16) will not notice any degradation or provide any assistance. However, if the task performance falls below a certain threshold, (Q>R) (secondary agent 16) assumes responsibility for the task to the extent that it perceives the performance to be failing and to the extent that it has sufficient capacity.

The overlapping region 402 in FIG. 4A indicates that the agents are both capable of performing certain functions from different perspectives. If both agents are performing correctly, these overlapping functions will be carried out for the application by the agent that has been assigned the task. On the other hand, if one agent fails to perform one of these functions, the other one can still provide the necessary functionality for the application. So, the two agents can provide fault tolerance for each other in this architecture.

FIG. 4B shows a UNION 410 representation where the primary agent 15 and secondary (or observer agent) agent 16 do not overlap. This capability enables the architecture to process multi-criteria decisions even when the criteria for the decisions are mutually exclusive (non-overlapping).

Although the present invention has been described with reference to specific embodiments, these embodiments are illustrative only and not limiting. Many other applications and embodiments of the present invention will be apparent in light of this disclosure and the following claims.

What is claimed is:

1. A method for performing a task in a control system, comprising:
   transmitting a command for executing the task to a governing agent;
   re-transmitting the command from the governing agent to a primary agent, a secondary agent and an observer agent;
   validating task information by a primary agent with a secondary agent and a observer agent prior to execution; and
   performing the task after validating, wherein the task is performed by the primary agent while the secondary agent monitors task execution and if the primary agent fails to execute the task and/or a threshold value is exceeded, the secondary agent performs the task.

2. The method of claim 1, wherein the step of validating the task prior to execution comprising:
   checking an equivalence of the command received by the primary agent with the secondary agent and the observer agent;
   checking an equivalence of the command received by the secondary, agent with the primary agent and the observer agent; and
   checking an equivalence of the command received by the observer agent with the primary agent and the secondary agent.

3. The method of claim 1, wherein the observer agent validates task information prior to execution.

4. The method of claim 1, wherein the command is executed continuously by the primary agent or the secondary agent.

5. The method of claim 1, wherein the command is executed without adding component redundancy.

6. The method of claim 1, wherein the threshold value is preset for a task.

7. The method of claim 1, further including configuring the primary agent to perform the task using a first set of resources and configuring the secondary agent to perform the task using a second set of resources wherein the first set of resources perform the task differently than the second set of resources.

8. A system for controlling and performing a task, comprising:
   an input module that transmits commands for executing a task to a governing agent that is operationally coupled to a processing unit, wherein the governing agent transmits the command to a primary agent, a secondary agent and an observer agent, and the task is validated by the primary agent with the secondary agent and the observer agent prior to execution and the task is executed by the primary agent while the secondary agent monitors task execution and if the primary agent fails to execute the task and/or a threshold value is exceeded, the secondary, agent performs the task.

9. The system of claim 8, wherein the task is validated prior to execution by checking an equivalence of the command received by the primary agent with the secondary agent and the observer agents; checking an equivalence of the command received by the secondary agent with the primary, agent and the observer agent; and the equivalence of the command receive by the observer agent with the primary agent and the secondary agent.

10. The system of claim 8, wherein the observer agent validates task information prior to execution.

11. The system of claim 8, wherein the command is executed continuously by the primary agent and the secondary agent.

12. The system of claim 8, wherein the command is executed without adding component redundancy.

13. The system of claim 8, wherein the primary agent and the secondary agent operate in relative isolation.

14. The system of claim 8, wherein the primary agent is configured to perform the task using a first set of resources and the secondary agent is configured to perform the task using a second set of resources wherein the first set of resources perform the task differently than the second set of resources.

15. The system of claim 8, wherein the task is performed in an aerial vehicle and commands are transmitted from the input module remote from the aerial vehicle.

16. The system of claim 15, wherein one of the commands is a maneuvering command.

17. The system of claim 16, wherein the maneuvering command is received by the governing a gent and retransmitted to the primary agent, the secondary agent and the observer agent.

18. The system of claim 17, wherein the task of the maneuvering command is validated by the primary agent, the secondary agent and the observer agent prior to execution.

19. The system of claim 15, wherein the primary agent is configured to perform the task using a first set of resources and the secondary agent is configured to perform the task using a second set of resources wherein the first set of resources perform the task differently than the second set of resources.

20. The system of claim 19, wherein the primer agent uses one or more of a rudder, ailerons, elevators and engine as the first set of resources to perform the task and the secondary agent uses one or more of a rudder, ailerons, elevators and engine that is not used by the primary agent as the second set of resources to perform the task.

* * * * *